United States Patent
Pylant

(10) Patent No.: US 8,165,793 B1
(45) Date of Patent: *Apr. 24, 2012

(54) SYSTEM AND METHOD FOR ROUTE REPRESENTATION WITH WAYPOINT STORAGE

(75) Inventor: Christopher D Pylant, Arlington, TX (US)

(73) Assignee: Williams-Pyro, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,521

(22) Filed: Jul. 16, 2011

Related U.S. Application Data

(63) Continuation of application No. 12/040,572, filed on Feb. 29, 2008, now Pat. No. 8,108,139.

(51) Int. Cl.
*G01C 21/00* (2006.01)
(52) U.S. Cl. ............... 701/206; 701/207; 342/357.31; 342/357.51
(58) Field of Classification Search .................. None
See application file for complete search history.

(56) References Cited

U.S. PATENT DOCUMENTS

| | | | | |
|---|---|---|---|---|
| 6,377,889 B1 * | 4/2002 | Soest | ............ | 701/207 |
| 6,522,958 B1 * | 2/2003 | Dwyer et al. | ............ | 701/3 |
| 6,529,821 B2 * | 3/2003 | Tomasi et al. | ............ | 701/202 |
| 6,952,180 B2 * | 10/2005 | Jonsson et al. | ............ | 342/357.51 |
| 2003/0014286 A1 * | 1/2003 | Cappellini | ............ | 705/5 |
| 2007/0299603 A1 * | 12/2007 | Kirby et al. | ............ | 701/207 |

OTHER PUBLICATIONS

Williams-Pyro, Inc.; Sales Order Detail, dated Oct. 30, 2007, created in Fort Worth, TX at Williams_Pyro Inc; attached copy printed Nov. 29, 2007 p. 1 of 1.
Williams-Pyro, Inc.; Shipment Log, dated Feb. 15, 2006, created in Fort Worth, TX at Williams-Pyro, Inc., attached copy printed Nov. 29, 2007 p. 1 of 1.
"How to Create & Use GPS Data," http://www.arch.columbia.edu/gis/howto/gps.html, downloaded Jan. 1, 2008, 5 pages.

* cited by examiner

*Primary Examiner* — M. Thein
*Assistant Examiner* — Ariel Yu
(74) *Attorney, Agent, or Firm* — Morani Patent Law, PC

(57) ABSTRACT

A method is provided, which optimizes a represented route of a traveling object. The method herein provides route representation compatible with various sampling protocols and accounts for high velocity states and near stand still states. In addition, route representation can be optimized for a given number of waypoints, accommodating a maximum waypoint storage file size. Waypoints are captured and significance scores are calculated and compared. The least significant waypoint is discarded in favor of a subsequently captured waypoint and the significance of waypoints surrounding the discarded waypoint are recalculated. By quantified waypoint selection the user can obtain an optimized route representation with quantified errors from a manageable number of waypoints.

17 Claims, 5 Drawing Sheets

SYSTEM AND METHOD FOR ROUTE REPRESENTATION WITH WAYPOINT STORAGE

CROSS REFERENCE TO RELATED APPLICATIONS

This application is a continuation application of U.S. patent application Ser. No. 12/040,572 filed on Feb. 29, 2008 now U.S. Pat. No. 8,108,139, the contents of which are hereby incorporated by reference in its entirety, and to which priority is claimed herein.

BACKGROUND OF THE INVENTION

The present invention relates generally to recording a route of a moving object. More particularly, the present invention relates to a method and system for optimizing the accuracy of the represented route to the actual route using limited resources.

It is often desirable to record the route of moving objects or craft, to include automobiles, watercraft, or aircraft. Such information can be used for fleet management, to include route optimization. In other applications, mere tracking of a vehicle's path may be desired for investigative purposes. Records of routes traveled can be desirable for safety and supervisory reasons as well. Clearly, there are a multitude of situations in which recording the route of a vehicle or a person is desirable.

Conventional tracking and waypoint acquisition methods include continuously recording global positioning system (GPS) data at a constant sampling frequency, and recording based on distance traversed. Waypoints are data which are stored to represent, recreate, a route and may be associated with a location of interest to the user. Waypoints may also be data records associated with turns, intersections, or other points of interest or route significance. Waypoints can have various position and information data associated with them, to include latitude, longitude, street name, time, and perhaps a user assigned waypoint name.

The numerous ways in which vehicle location can be sampled may impact, among other things, the recorded route accuracy. For example, the position of a vehicle could be sampled as a function of time. If the sampling interval were constant, the same number of vehicle positions, or waypoints, would be recorded in a time period of thirty minutes, regardless of whether the vehicle were standing still or cruising at highway speeds. A similar comparison is drawn to recording positions of a watercraft. A constant time interval for aircraft can also be limiting, in that, for example, position data of an aircraft while on the ground may not need to be sampled at the same interval as the position data of the aircraft when airborne.

The operation, utilization, and tracking of un-manned vehicles can also benefit from an accurate and efficient route recording system and method. In addition to vehicles, there are numerous applications for route recording of mobile instrumentation. While vehicle position may be derived solely from GPS data, instrumentation or other equipment may comprise a gyroscope for position data and a distance encoder. A system and method of route recording which is compatible with data from a GPS or from a gyroscope with a distance encoder, such as that mounted on mobile instrumentation, is desirable.

Examples of route representation in non-vehicles include recording the route of drill heads, or down-hole instruments. Accurate and efficient route recordings of such instrumentation or excavating equipment can provide valuable information for oil field management, operation, and safety at large.

Differences in use, terrain, or purpose for monitoring can make a constant rate sampling protocol yield an inefficient and inaccurate route recording. Sampling and waypoint storage, as a function of vehicle or instrument speed can be limiting as well. For example, recording vehicle position at higher speeds may not be necessary on a straight path. Conversely, recording vehicle positions less frequently under lower speed conditions may also not be desirable because of frequent changes in vehicle direction.

In some situations, there is a desire to minimize the number of points recorded to represent the route because of memory limitations, memory conservation objectives, data transfer constraints, the extensiveness of a routes, or processing burdens. In other situations, recording of minute displacements are needed to ascertain deviations from an intended route and an executed route. Comparisons of routes may be desired, which may yield yet another set of desired criteria for waypoint recording. For example, a comparison of flood routes before and after significant construction may be desired.

Waypoint recording at a constant frequency or recording which is dependent upon vehicle or instrumentation speed can yield an inaccurate represented route. Route recordings under various mobility means to include: land vehicle; aircraft; watercraft; non-motorized vehicles; persons; un-manned vehicles and non-vehicle instrumentation can all benefit from a method of optimized waypoint selection and route representation.

It is also desirable for a user to have control over the memory requirements and processing demands and the effect of the same to the accuracy of a represented route. An accurate representation of a route which optimizes the use of available memory or reduces memory requirements, while enabling efficient processing of position records into route representation is desirable. A method of assessing the accuracy of a recorded route is also desirable.

SUMMARY OF THE INVENTION

The present invention provides a system and method for optimum route representation addressing one or more of the issues presented above.

One aspect of the present invention is to provide accurate route recording data which can be readily and timely transferred to a display unit.

Another aspect of the present invention is to provide accurate route recording data which is readily and timely transferred via a wireless network link for display or computation.

Another aspect of the present invention is to provide a method of optimum route representation for a given number of waypoints or for a given waypoint storage capacity.

Still another aspect of the present invention is to enable efficient processing of a recorded route by optimizing the waypoint selection process and number of stored waypoints.

Still another aspect of the present invention is to provide a method of ranking the importance of any waypoint in a route recording, assessing the contribution of any one waypoint to the current route is desirable, and quantifying error in route representation as a function of waypoint selection.

Still another aspect of the present invention is to provide a method of waypoint selection for optimum route representation that is independent of the sampling frequency or travel velocity.

The waypoint recording and route representation, in accordance with the present invention, is independent of the waypoint data sampling protocol and is compatible with various sampling protocols.

The waypoint data and route representation acquired in accordance with the present invention can be used alone or in conjunction with other measurements to assess and estimate, for example, optimum travel routes.

The waypoint data and route representation acquired in accordance with the present invention can be used alone or in conjunction with other measurements to assess personnel performance.

The waypoint data and route representation acquired in accordance with the present invention can be used alone or in conjunction with other measurements to assess the performance of instrumentation or un-manned vehicles.

The waypoint data and route representation acquired in accordance with the present invention can be used to compare navigational systems.

Yet another aspect of the present invention is to provide a method of quantifying error in route representation position with respect to time.

Yet another aspect of the present invention is to provide a method of quantifying error in route representation as a function of waypoint selection with respect to a vehicle's location at the time in which each respective waypoint is captured, accounting for traveling velocity.

Yet another aspect of the present invention is to provide a method of accounting for differences between represented distance traveled and the distance actually traveled.

Yet another aspect of the present invention is to attribute significance to a waypoint based on velocity or distance traveled while providing an optimum route representation.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein.

DETAILED DESCRIPTION OF THE INVENTION

Figure 1:
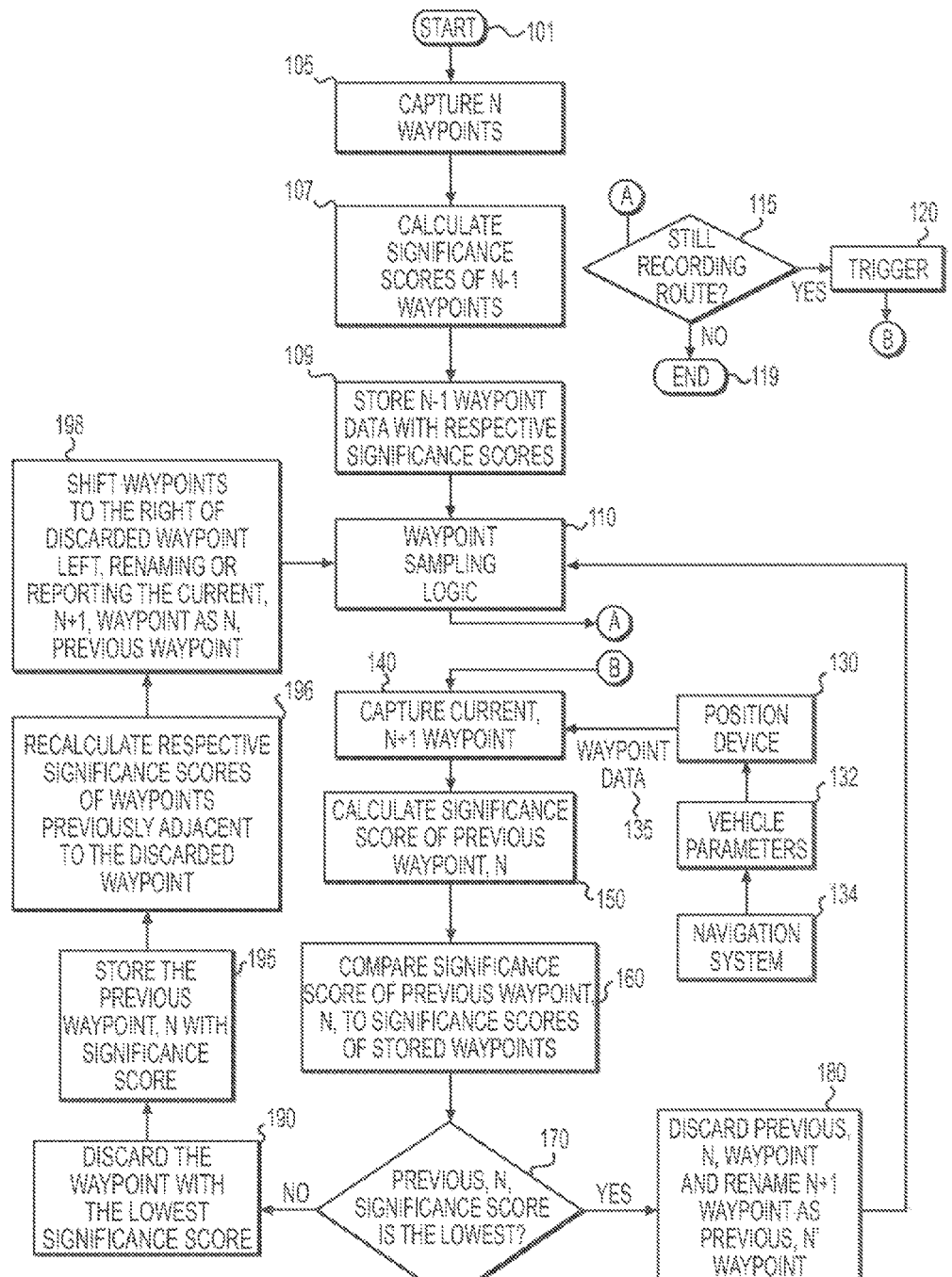
FIG. 1 shows a flow diagram of a method of route representation by waypoint selection in accordance with an exemplary embodiment of the present invention.

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are merely illustrative of ways to make and use the invention, and do not limit the scope of the invention.

The present invention can be used for optimum route waypoint recording in a multitude of movable objects, to include: land vehicles, non-motorized vehicles, aircraft, watercraft, persons, and un-manned vehicles. A conventional vehicle operation and maintenance data recording system may include an electronic module which connects to a vehicle's diagnostic port. Diagnostic, vehicle parameters, and other information are collected as the vehicle is operated. This data may be readily transferred to a computer via a wireless networking link. Examples of recorded data may include odometer readings, speed history, fault codes, and idle times. This data can be used, for example, to analyze vehicle operation for performance and safety, and such analysis can in turn lead to changes in operation and maintenance, for example. When such recording systems are utilized across at least a representative number of fleet vehicles, the collected data can be utilized to evaluate fleet management programs.

Incorporation of position data into a vehicle operation and maintenance data recording system can provide data for fleet management on yet a further level, to include route management and estimated delivery and arrival times. A GPS device can be used to acquire data from which to calculate and record a vehicle's position. Position data can be recorded with respect to time, and may be two dimensional, such as latitude and longitude. Position data can be time stamped with respect to a local time source or an atomic time source.

Different waypoint sample protocols to acquire position data may yield different route representation results in a conventional route representation system. For example, a uniform sample period based on expected time of operation will sample and record data at a give periodicity. If a vehicle is expected to be operated for eight hours, a sampling period of every two minutes yields a total of 240 waypoints. A waypoint acquisition module would simply record the vehicle's location every two minutes. This technique gives equal importance to all waypoints, even waypoints taken while the vehicle is stationary for an extended time.

In another waypoint sampling protocol based on distance, for example, a position data may be sampled every block. Over the same eight hour period and traveling the same route as that traveled in the two minute sampling interval, above, can yield a different route representation. For example, suppose a position data point is sampled every block and the vehicle travels at 60 mph for a 30 minute stretch, this would yield 12*30 or 360 waypoints sampled and recorded in just that half-hour of the total eight hours traveling time. Using a constant distance sampling interval, a conventional route representation method may not yield an accurate represented route and would vary from the route represented by the two minute sampling protocol for almost any actual route except a straight line. A method of optimizing route representation regardless of the sampling protocol and a means of evaluating the relative significance to route representation of captured waypoints is provided in accordance with embodiments of the present invention. The overall represented route accuracy can be assessed as a function of the highest discarded waypoint significance score and as a function of all significance scores.

Sampling protocols may be tied to a GPS receiver or may be restricted by other means. The route representation of the present invention is compatible with various sampling protocols and accounts for high velocity states and near stand still states. In addition, route representation can be optimized for a given number of waypoints, accommodating a maximum waypoint storage file size. Controlling the stored file size facilitates a multitude of transactions and processes to include data transfer across wireless links over a limited access time or a limited bandwidth.

FIG. 1 shows a flow diagram of an exemplary method of waypoint selection and optimized route representation in accordance with the present invention for a desired number of waypoints, N. Initially, N waypoints are captured 105 and significance scores of N−1 waypoints are calculated 107. The significance scores with respective waypoint data is stored for N−1 waypoints 109. The waypoint sampling logic 110 triggers 120 acquisition of waypoint data 135. Waypoint data includes position data from a position device 130 and may include vehicle parameter data 132 and data from a navigational system 134. Following capture of a current waypoint 140, initially N+1, the significance score of the previous waypoint, initially N, is calculated 150 using at least N+1 waypoint data and N−1 waypoint data. A comparison is made across the significance score of the previous waypoint and the significance scores of stored waypoints 160. A determination is made as to whether the previous waypoint significance score is the lowest of all significance scores 170. If the significance score of the previous waypoint is the lowest, then it is discarded, not stored, and the current waypoint, N+1, is renamed the previous waypoint, N 180. If the previous waypoint's significance score is not the lowest, the waypoint with the lowest significance score is discarded 190 and the previous waypoint data and respective significance data are stored 195. The significance of waypoints previously adjacent to the discarded waypoint are recalculated 196 and waypoints right of the discarded waypoint are shifted left, renaming or repointing the current N+1 waypoint as previous N waypoint 198. The process is repeated beginning from waypoint sampling logic 110 triggering 120 capture of a current, N+1, waypoint 140 until the route is no longer being recorded 119.

In the exemplary embodiment shown in FIG. 1, significance can be calculated using the data of three consecutive waypoints 150, however, one of ordinary skill can readily appreciate significance scores of as a function of a greater number of waypoints.

Discarding of a waypoint can be achieved by numerous ways in accordance with the present invention. For example, the position information 135 may be stored in a flash memory device. Once stored on a flash memory device, data may not be easily manipulated. An ordered index array can be used in RAM to point to the actual waypoint data on the flash device. The elements of the ordered index array indirectly point to the actual data of a respective waypoint. When a waypoint is discarded 190 all of the more recent waypoint index values, all those to the right, are shifted left over writing the index to the discarded waypoint data and making way for a new index at the right-most position of the index array. In the flash memory device example, the actual discarded waypoint data may not be immediately altered, but is available for subsequent erasure during, for example, memory defragmentation.

In many situations, memory for storing waypoints may be limited. Also in many situations the extent and complexity of a vehicle's route cannot be predicted. For these reasons and others, it is desirable to assess the significance of each captured waypoint as to its contribution to accuracy of route representation. As memory limits are approached, as measured perhaps by the number of stored waypoints, it is an advantage of the present invention to quantify the significance of already stored waypoints and a present waypoint to determine which waypoint to delete, that will yield the minimum effect on route representation accuracy.

Figure 2:
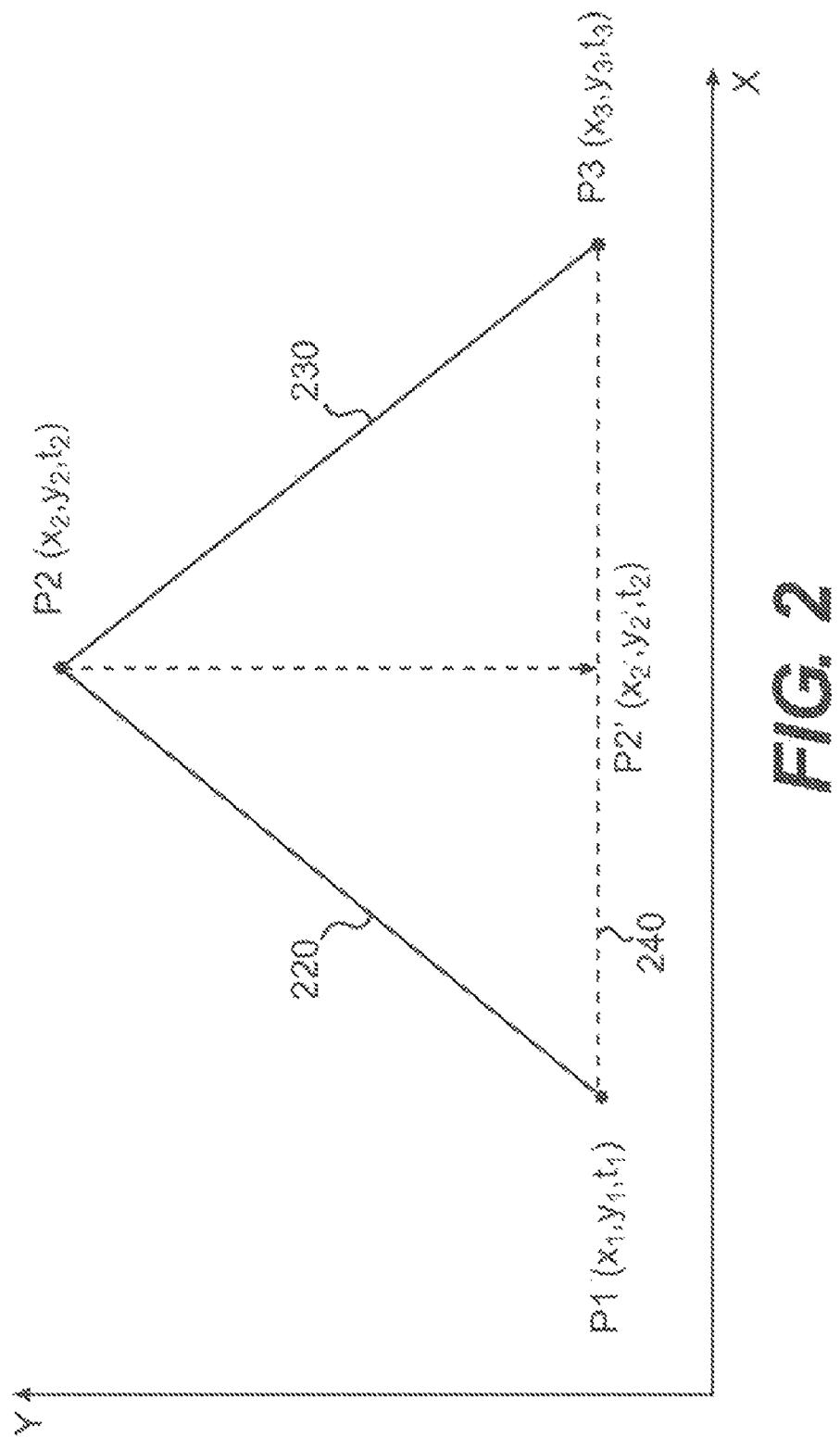
FIG. 2 shows an example of route representation in accordance with an exemplary method of the present invention.

In the exemplary embodiment of FIG. 1, three consecutive waypoints are used to calculate the significance score of any given waypoint. Suppose points P1, P2, and P3 of FIG. 2 represent three waypoints in a route represented using the method of FIG. 1, Points P1, P2, and P3 are shown on a Cartesian grid. In the exemplary embodiment of FIGS. 1 and 2, the time of each waypoint capture, each position data, is also known. Capture times can be arbitrary, or at least not at a constant sampling frequency. Each position and time of waypoint capture is represented as a function of two dimensional Cartesian coordinates plus time, where: P1 is a function of $x_1$, $y_1$, and $t_1$; P2 is a function of $x_2$, $y_2$, and $t_2$; and P3 is a function of $x_3$, $y_3$, and $t_3$.

Discarding only the lowest significance score assures that the most accurate represented route is obtained with respect to deviations from the actual route, in accordance with the present invention.

Examples of errors or significance scores in accordance with the present invention include: error in overall distance traversed; and error in the vehicle's estimated or represented position at the time the discarded waypoint was captured. Referring to FIG. 2, the effect of discarding P2 can be determined as the error in overall distance traversed, d, as calculated by equation 1, below.

$$d = \sqrt{(x_2-x_1)^2+(y_2-y_1)^2} + \sqrt{(x_3-x_2)^2+(y_3-y_2)^2} - \sqrt{(x_3-x_1)^2+(y_3-y_1)^2}$$ Equation 1

The error d in distance traversed between points P1 and P3 when P2 is removed from the waypoint list is the sum of segments P1P2 220 and P2P3 230 minus the distance of segment P1P3 240, which is calculated in two dimensions using Equation 1. Referring to FIG. 1, in accordance with this exemplary embodiment, the significance score of P2 is d, as calculated 150 using Equation 1.

Figure 3:
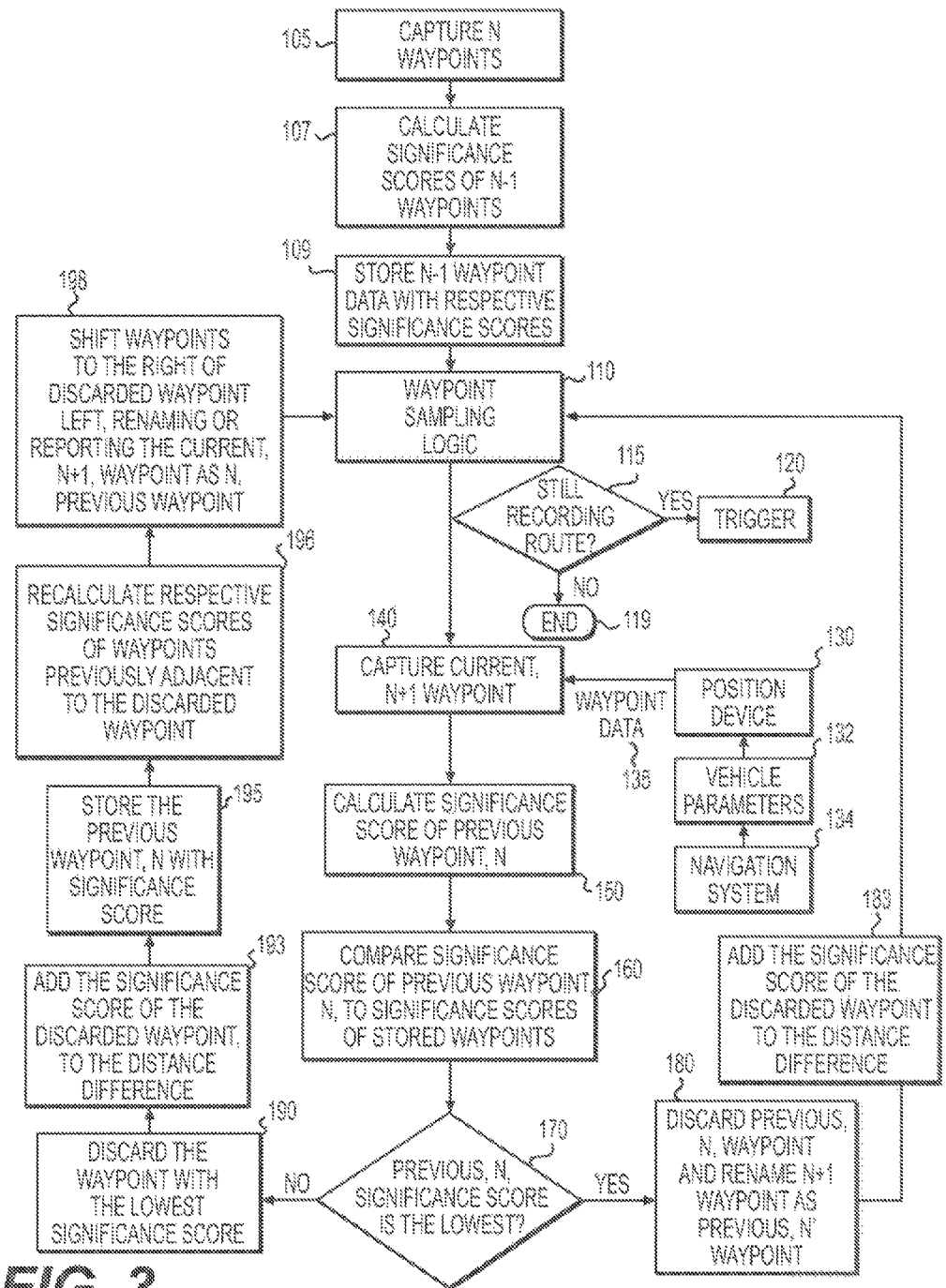
FIG. 3 shows a flow diagram of a method of route representation by waypoint selection in accordance with an exemplary embodiment of the present invention, with the additional steps to provide the error between the distance of the represented route and the distance actually traveled.

In another embodiment, the sum of all significance scores of discarded waypoints enables users to ascertain the difference between the travel distance shown by the represented route and the actual distance traveled, as shown for example in FIG. 3. FIG. 3 shows a flow diagram of an exemplary method of waypoint selection and optimized route representation in accordance with the present invention for N waypoints with the additional steps to provide the error between the distance of the represented route and the distance actually traveled. The significance score of the discarded waypoint is added to a running total of distance difference 193, 183 between the travel distance shown on the represented route and the distance actually traveled.

A significance score based on the error in an estimated position at a certain time versus the actual position, e, accounts for velocity. In accordance with this embodiment, a waypoint which lies on a straight line between neighboring waypoints yields a high significance score if the vehicle does not maintain a substantially constant velocity between neighboring waypoints. Referring to FIG. 2, prior to deletion of waypoint P2 from the route, the vehicle's location is known accurately at the time P2 was captured. When P2 is deleted, its position is to interpolated to a position P2' along the tine P1P3 240 in order to estimate the vehicle's location at that same time. An expression for this error, e, is made in accordance with an exemplary embodiment of the present invention by using the series of equations below.

Velocity may be part of a waypoint data set captured from a vehicle parameter module 132, a navigation system 134, or a position device 130, however, the velocity value may not be available or may not be useful for the purpose of calculating error, e. First, the vehicle's position at time $t_2$ is estimated by linearly interpolating along the line P1P3 resulting in P2', where time $t_2$ is the time at which waypoint P2 was captured. This position P2' is the position in the route representation which will result if waypoint P2 is discarded. The x, y coordinates for P2' are designated as $(x_2', y_2')$, as shown in FIG. 2. The vehicle position in the route representation at time $t_2$ which will result if waypoint P2 is discarded, P2', is calculated using Equations 2 through 5 below.

$$P_2'(x_2', y_2') = \left(\frac{rx_1 + sx_3}{r+s}, \frac{ry_1 + sy_3}{r+s}\right) \quad \text{Equation 2}$$

where, $$r = t_2 - t_1 \quad \text{Equation 3}$$

and $$s = t_3 - t_2. \quad \text{Equation 4}$$

$$P_2'(x_2', y_2') = \left[\frac{(t_2 - t_1)x_1 + (t_3 - t_2)x_3}{t_3 - t_1}, \frac{(t_2 - t_1)y_1 + (t_3 - t_2)y_3}{t_3 - t_1}\right] \quad \text{Equation 5}$$

The error e in estimated position at time $t_2$ is the distance between P2 and P2' and is calculated using Equations 6 through 9, shown below.

$$e = \sqrt{(x_2' - x_2)^2 + (y_2' - y_2)^2} \quad \text{Equation 6}$$

$$e = \sqrt{\left(\frac{rx_1 + sx_3 - (r+s)x_2}{r+s}\right)^2 + \left(\frac{ry_1 + sy_3 - (r+s)y_2}{r+s}\right)^2} \quad \text{Equation 7}$$

$$e = \sqrt{\left(\frac{r(x_1 - x_2) + s(x_3 - x_2)}{r+s}\right)^2 + \left(\frac{r(y_1 - y_2) + s(y_3 - y_2)}{r+s}\right)^2} \quad \text{Equation 8}$$

$$e = \sqrt{\left(\frac{(t_2 - t_1)(x_1 - x_2) + (t_3 - t_2)(x_3 - x_2)}{t_3 - t_1}\right)^2 + \left(\frac{(t_2 - t_1)(y_1 - y_2) + (t_3 - t_2)(y_3 - y_2)}{t_3 - t_1}\right)^2} \quad \text{Equation 9}$$

By using either of the above described errors to calculate significance scores for waypoints and by employing these scores in the method shown in FIG. 1, the user is able to attribute significance to a waypoint based on position as a function of time or distance traveled, while providing an optimum route representation.

Figure 4:
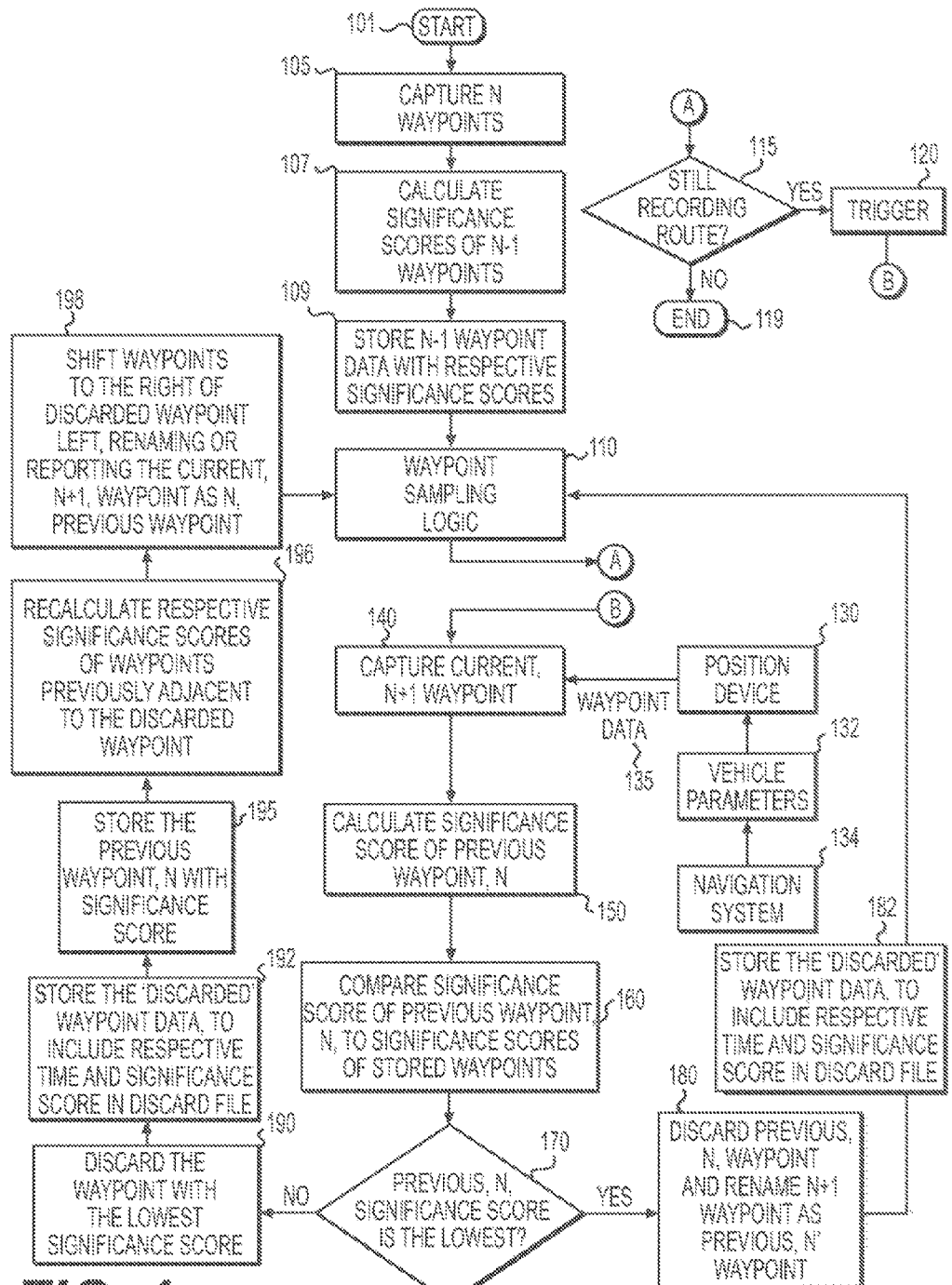
FIG. 4 shows a flow diagram of a method of route representation by waypoint selection in accordance with an exemplary embodiment of the present invention to include the capability of assessing error in estimated position at a specific time.

The error in the represented route by deleting P2, or the significance score of P2 to route accuracy, can be determined and quantified in various ways. In the example described above, three consecutive waypoints are used to calculate the significance of the middle waypoint. By using Equation 1, significance is a function of the difference between the distance actually traveled and the distance represented. By using the method described by Equations 2 through 9, the error in vehicle position relative to actual position for a given time is quantified. This method accounts for changes in velocity. In accordance with another exemplary embodiment, the discarded waypoints and respective time and significance scores can be saved as a separate file 192, 182, as shown for example in FIG. 4. Discarded waypoint data, a discarded file, can be used in a number of ways to include overlaying the represented route and evaluating the accuracy of the represented route.

While an error between route represented position P2' and actual position P2 without regard to time or velocity can be determined by calculating the perpendicular distance of the subject waypoint from a line segment between adjacent waypoints P1P3, this error would not account for the distance traveled, velocity, or position with respect to time. Time can be a critical factor in route representation and a in subsequent user evaluation of the route. Perhaps the user needs to know the accuracy of a person or vehicle's represented position at a specific time. Waypoint selection based solely on perpendicular distance error does not yield an optimum route representation with respect to position as a function of time.

Figure 5:
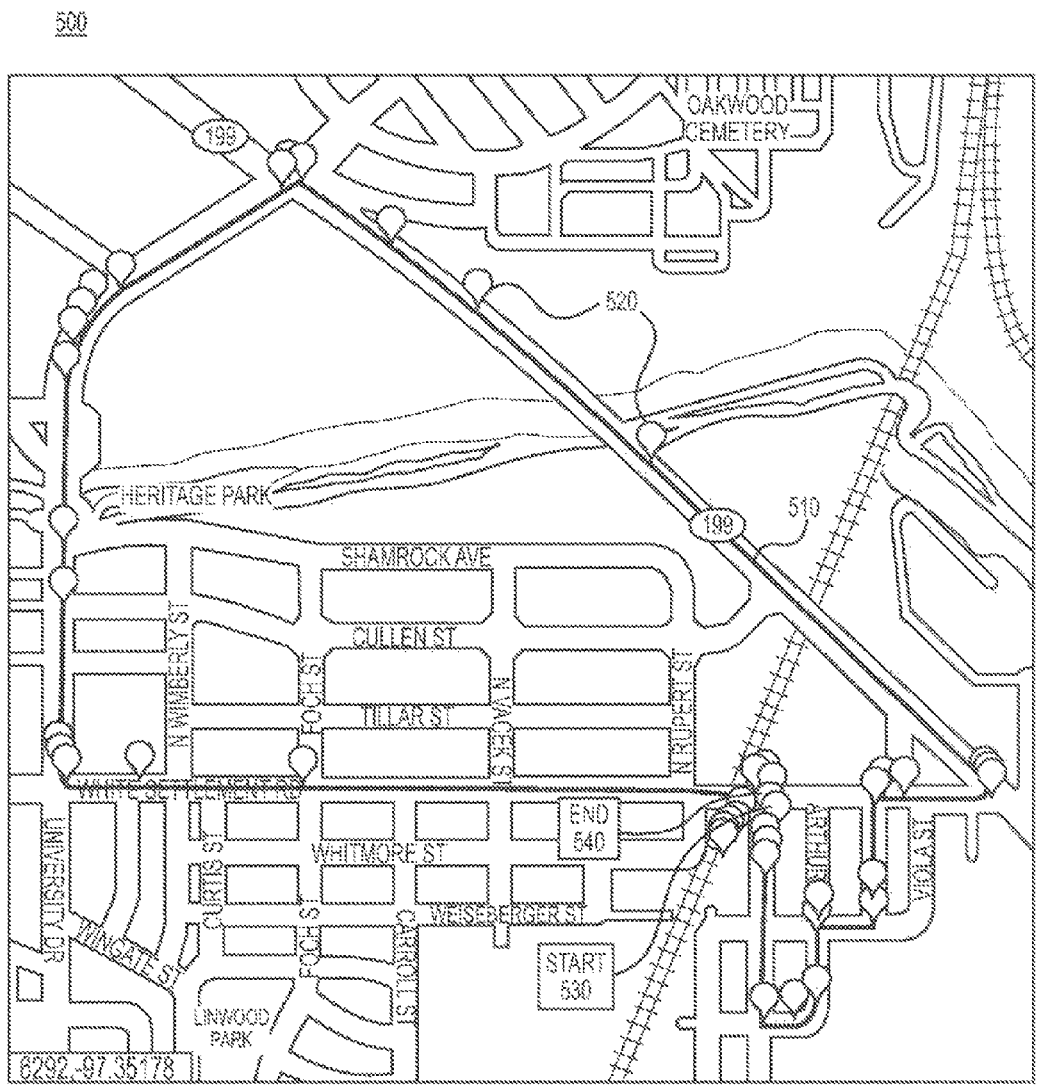
FIG. 5 illustrates an optimized route representation derived from waypoint selection in accordance with an embodiment of the present invention.

FIG. 5 illustrates an optimized route representation 510 derived from waypoint selection by assigning a significance score of e using the method described by Equations 2 through 9, in accordance with an embodiment of the present invention. The resultant represented route 510 is plotted using Google maps and is shown overlaid on map 500. Position data was sample at constant sampling interval of 1 second. A total of 46 waypoints 520 are used to represent the route, which starts 530 and ends 540 at nearly the same position. As seen from FIG. 5, many of the waypoints do not correspond to a change in direction. These waypoints have a significance score to avoid deletion for a route representation comprising 46 waypoints because of a change in vehicle velocity at that location.

The same methods can be extrapolated to a three dimensional route representation. Three dimensional position data is also available with some GPS systems. Observations from four satellites are needed to compute a three-dimensional position since the mathematical solution involves solving not only for x, y and z Cartesian coordinates, but also the time error at the receiver. Since these four unknown variables are solved for, greater processing resources or more processing time is required as compared to two dimensional positioning. Alternate means of obtaining three dimensional waypoint data include incorporating depth finder data or altimeter data with two dimensional GPS data. Yet another method in accordance with the present invention utilizes gyroscope or inclinometer data in conjunction with two dimensional GPS data to obtain three dimensional data. The gyroscope or inclinometer may be particularly preferred in instrumentation applications as opposed to vehicle applications.

In accordance with an exemplary route module can estimate, represent, a vehicle's location (latitude and longitude) at essentially arbitrary times. An example of using the present invention follows. When a vehicle leaves the depot, the route module will begin recording the vehicle's position at times throughout the day. It will maintain a list of those times and positions within internal memory. When the vehicle returns to its depot, the route module will transfer a list of time-stamped represented route positions to a depot computer perhaps with other diagnostic data. When the exemplary method comprising calculation of an e significance is used, then a second file may be created and transferred, which represents the differences between the positions in a represented route and the actually traveled route for vehicle positions as a function of time.

Limiting the number of waypoints used in route representation may be desired in numerous situations. In one situation, limiting the number of waypoints used in route representation may be desirable because of processing burdens. In another situation, the it may be desirable to decrease the number of waypoints used to represent a route in favor of increased stored information for any given waypoint when there is limited storage or memory for stored waypoints.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

The invention claimed is:

1. A storage medium storing an executable code, which when executed performs a method of recording a representative traversed route, the method comprising:
   capturing a first permanent waypoint;
   assigning a highest significance score to the first waypoint and storing the assigned significance score of the first waypoint with the first waypoint data;
   capturing N subsequent waypoints, wherein N is an integer and is at least 3;
   calculating significance scores of N−1 waypoints;
   storing the calculated significance scores of N−1 waypoints with respective N−1 waypoint data;
   triggering acquisition of a current N+1 waypoint;
   calculating a significance of a previous N waypoint;
   comparing the calculated significance score of the previous N waypoint to each stored calculated significance score;
   if the significance score of the previous N waypoint is less than stored significance scores; then discard the previous N waypoint and rename the current N+1 waypoint as the previous N waypoint;
   if the previous N waypoint's significance score is not less than stored significance scores, then:
      discard a waypoint with a lowest stored significance score;
      store the previous N waypoint data and respective significance data;
      recalculate and store the significance of waypoints previously adjacent to the discarded waypoint;
      shift waypoints right of the discarded waypoint left; and
      rename the current N+1 waypoint as the previous N waypoint;
   repeating the triggering of acquisition of a current N+1 waypoint and subsequent steps until a route is no longer being recorded;
   compiling stored waypoint data of N waypoints and the first waypoint forming a recording of a representative traversed route;
   transferring stored waypoint data for display or download; and
   wherein, calculating the significance score of a captured waypoint comprises calculating an error in a representative distance traversed in the absence of said captured waypoint.

2. The method according to claim 1, further comprising: displaying the recording of the representative traversed route.

3. The method according to claim 1, wherein: the waypoints comprise position data acquired from a global positioning system (GPS) device.

4. The method according to claim 1, wherein: the waypoints comprise vehicle parameter data.

5. The method according to claim 1, wherein: the waypoints comprise navigational system data.

6. The method according to claim 1, wherein: the waypoints comprise three dimensional position data.

7. The method according to claim 1, wherein: calculating significance scores of the captured waypoint comprises using position data of three consecutive waypoints.

8. The method according to claim 1, further comprising: adding the significance score of the discarded waypoint to a running total of distance difference between a representative travel distance and a distance actually traveled; and
exporting the running total of distance difference for display or exporting the running total of distance difference with the recording of the representative traversed route.

9. The method according to claim 1, further comprising: quantifying an accuracy of the representative route as a function of a highest of waypoint significant scores.

10. A storage medium storing an executable code, which when executed performs a method of recording a representative traversed route, the method comprising:
   capturing a first permanent waypoint;
   assigning a highest significance score to the first waypoint and storing the assigned significance score of the first waypoint with the first waypoint data;
   capturing N subsequent waypoints, wherein N is an integer and is at least 3;
   calculating significance scores of N−1 waypoints;
   storing the calculated significance scores of N−1 waypoints with respective N−1 waypoint data;
   triggering acquisition of a current N+1 waypoint;
   calculating a significance of a previous N waypoint;
   comparing the calculated significance score of the previous N waypoint to each stored calculated significance score;
   if the significance score of the previous N waypoint is less than stored significance scores, then discard the previous N waypoint and rename the current N+1 waypoint as the previous N waypoint;
   if the previous N waypoint's significance score is not less than stored significance scores, then:
      discard a waypoint with a lowest stored significance score;
      store the previous N waypoint data and respective significance data;
      recalculate and store the significance of waypoints previously adjacent to the discarded waypoint;
      shift waypoints right of the discarded waypoint left; and
      rename the current N+1 waypoint as the previous N waypoint;

repeating the triggering of acquisition of a current N+1 waypoint and subsequent steps until a route is no longer being recorded;

compiling stored waypoint data of N waypoints and the first waypoint forming a recording of a representative traversed route;

transferring stored waypoint data for display or download; and wherein, calculating the significance score of a captured waypoint comprises calculating a significance of a captured waypoint as an error in represented position at a time of the waypoint capture in the absence of said captured waypoint.

11. The method according to claim 10, further comprising:

saving discarded waypoints and respective time and significance scores as a separate file.

12. The method according to claim 10, wherein:

the calculating significance scores of the captured waypoint comprises using position data at a respective time of three consecutive waypoints.

13. The method according to claim 10, wherein:

the waypoints comprise position data acquired from a global positioning system (GPS) device.

14. The method according to claim 10, wherein:

the waypoints comprise vehicle parameter data.

15. The method according to claim 10, wherein:

the waypoints comprise navigational system data.

16. The method according to claim 10, wherein:

the waypoints comprise three dimensional position data.

17. The method according to claim 10, further comprising:

displaying the recording of the representative traversed route.

* * * * *